(12) United States Patent
Kumar

(10) Patent No.: US 9,869,415 B2
(45) Date of Patent: Jan. 16, 2018

(54) COUPLING NUT ASSEMBLY

(71) Applicant: Ajay Kumar, Palmdale, CA (US)

(72) Inventor: Ajay Kumar, Palmdale, CA (US)

( * ) Notice: Subject to any disclaimer, the term of this patent is extended or adjusted under 35 U.S.C. 154(b) by 285 days.

(21) Appl. No.: 13/804,901

(22) Filed: Mar. 14, 2013

(65) Prior Publication Data

US 2014/0284918 A1  Sep. 25, 2014

(51) Int. Cl.
  *F16L 19/025*  (2006.01)

(52) U.S. Cl.
  CPC ....... *F16L 19/025* (2013.01); *Y10T 29/49826* (2015.01)

(58) Field of Classification Search
  CPC .............................. F16L 19/025; F16L 19/005
  USPC .............. 285/36, 93, 92, 89, 386, 354
  See application file for complete search history.

(56) References Cited

U.S. PATENT DOCUMENTS

| | | | |
|---|---|---|---|
| 1,002,774 A * | 9/1911 | Stouffer | F16L 37/252 285/332.4 |
| 4,836,727 A | 6/1989 | Volkmann | |
| 5,127,679 A * | 7/1992 | Pouplier | F16L 19/005 285/86 |
| 6,036,236 A * | 3/2000 | Bensel | F28F 9/0234 285/89 |
| 8,016,612 B2 | 9/2011 | Burris et al. | |
| D669,558 S | 10/2012 | Collin et al. | |
| 2003/0197382 A1 * | 10/2003 | Fischer | F16K 27/003 285/423 |
| 2009/0218813 A1 * | 9/2009 | Helstern | F16L 15/08 285/355 |
| 2011/0169258 A1 * | 7/2011 | Nowak | F16L 19/025 285/18 |
| 2011/0175348 A1 * | 7/2011 | Bogert | F16L 19/10 285/313 |
| 2012/0117784 A1 | 5/2012 | Collin et al. | |
| 2013/0076030 A1 * | 3/2013 | Fog | F16L 19/025 285/362 |

FOREIGN PATENT DOCUMENTS

| | | | | |
|---|---|---|---|---|
| DE | 4442075 C1 * | 6/1996 | | F16B 7/182 |
| GB | 2046389 A * | 11/1980 | | F16L 19/005 |

* cited by examiner

*Primary Examiner* — David Bochna
(74) *Attorney, Agent, or Firm* — Innovation Capital Law Group, LLP; Vic Lin

(57) ABSTRACT

A coupling assembly for coupling annular fittings includes first and second coupling elements. The first coupling element defines interior and exterior opposite surfaces, and first and second end opposite portions. The first coupling element includes a plurality of flexible tabs slantedly protruding from the exterior surface; and also includes threads configured along the interior surface at the first end portion. The second end portion is non-threaded. The second coupling element defines inner and outer opposite surfaces. The second coupling element includes a plurality of rigid tabs vertically protruding from the inner surface. The second coupling element coaxially engages the first coupling element such that the flexible tabs and rigid tabs interact with each other to tighten and loosen the coupling assembly against the annular fittings via torque application. While tightening, the non-threaded second end portion and the flexible tabs and rigid tabs combination preclude over-tightening.

8 Claims, 22 Drawing Sheets

COUPLING NUT ASSEMBLY

BACKGROUND

Field of Endeavor

The present disclosure relates to a fitting assembly, and more particularly, to a coupling nut assembly for coupling annular fittings.

Brief Description of the Related Art

A coupling nut is commonly used to connect annular fittings for establishing a connection between two equipment ports, such as between a fill valve of a tank and an inlet/outlet water port. More often than not, typical use of the coupling nut may be evident in relation to plumbing connection between the fill valve shank of the tank, such as a toilet tank, and an inlet/outlet water port for supplying/draining water. A bottom portion of the fill valve shank of the toilet tank is connected to the inlet port of a water pipe via plastic or stainless braided hose by utilizing the coupling nut. For such coupling, or when required decoupling, the coupling nut generally requires a hand tightening or loosening operation thereon. For enabling such tightening and loosening, threads are incorporated over mating surfaces of coaxial flanged connector components of the coupling nut. An outer coaxial connector component is rotated against an inner coaxial connector component through the threads for tightening and loosening the coupling nut to couple or decouple the water pipe with the fill valve shank. The coupling nut usually fails if subjected to over-tightening. The over-tightening of the coupling nut is more common in case of machine tightening of the coupling nut. To address the issue of application of over-tightening, several attempts in the past have been made. For instance, generally, conventional coupling nuts are hexagonal-shaped that prompts users for machine tightening, such as to use wrenches to tighten thereto, so the various attempts have been made to change the shapes of such coupling nut that do not prompt the use of wrenches for tightening thereto.

In an another attempt, manuals for installation of the coupling nut clearly have been modified to include recommended use of hand tightening and loosening operations to be performed on the coupling nut to avoid premature breakage of the coupling nut due to over-tightening. A typical coupling nut 'N' with such an instruction and breakage due to over-tightening may be evident in FIGS. 11A to 11E. Particularly FIG. 11A illustrates the coupling nut 'N' assembled with the annular fittings, and FIGS. 11B to 11E illustrate breakage thereof due to over-tightening.

However, hand tightening of the coupling nut may even not be able to preclude over-tightening of the coupling nut completely due to the inherent configuration of the threads formed in the coupling nut, more particularly, the configuration of the threads at along a bottom portion of an inner circumference side of the one of coaxial connector component. A typical inner coaxial connector component 'C' may be evident in FIGS. 12 and 13A to 13C. The coaxial connector component 'C' along the inner circumference side 'I' includes threads 'T,' that results connection of the coaxial connector components 'C' with the annular fittings. Further, the threads 'T' also extend towards a bottom portion 'B' (mentioned as 'Bottom Thread Region' '$T_1$') along the inner circumference side 'I' of the coaxial connector component 'C.' Such 'Bottom Thread Region' '$T_1$' is such that it may provoke additional rotation of the coupling nut than what is generally required. Such additional rotation or say over-tightening of the coupling nut may increase tensile stresses on a first thread of the 'Bottom Thread Region' '$T_1$', as indicated by arrow. Further, a compression seal 'S,' (see FIG. 13A) a component of the coupling nut 'N' that is disposed between the annular fittings also applies an opposite tensile stress of the tensile stress due to the thread tightening (as indicated by arrow), in turn developing higher stress in a bottom flanged region 'F' of the coupling nut, as indicated by a horizontal line 'H' in FIG. 13A, thereby resulting in failure of the nut. FIGS. 13A to 13C illustrated herein depict such tensile stress in the bottom flanged region 'F.' Specifically, FIG. 13B illustrates stress transfer mechanism on the bottom flange region resulting fracture. Further, FIG. 13C illustrates a stress profile of the conventional coupling nut housing.

Such tensile stress results failure of the coupling nut, which may in-turn cause leakage or flooding. The coupling nut may fail instantly or may fail subsequently due to creep. Since the data on how the coupling nut modulus changes when subjected to constant stress may not be generally available, it may become even harder to predict when subsequent failure of the coupling would take place, thereby resulting in unexpected leakage or flooding.

While the previously known coupling nuts may have generally been considered satisfactory for their intended purposes, there has remained a need in the art for a coupling nut that can be improved to be substantially more manageable in terms of avoiding over-tightening and resultant fracture to avoid unexpected or potential leakage or flooding.

SUMMARY

The present disclosure discloses a coupling assembly, that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a coupling assembly that may be capable of effectively establishing connection between two potential ports, generally relating to sink and water tank ports via a pipe, enabling manual operation.

Another object of the present disclosure is to describe a coupling assembly that may be capable of precluding or avoiding over-tightening of the coupling assembly.

A further object of the present disclosure is to describe a coupling assembly that may preclude or avoid resultant fracture caused due to over-tightening of the coupling assembly, thereby avoiding unexpected or potential leakage or flooding.

Yet a further object of the present disclosure is to describe a coupling assembly that may be capable of being economically fabricated and assembled with relative ease.

In one aspect of the present disclosure, a coupling assembly, for coupling annular fittings, is described to achieve one or more objects of the present disclosure. The coupling assembly includes a first coupling element and a second coupling element coaxially coordinating each other. The first coupling element defines interior and exterior surfaces opposite to each other, and first and second end portions opposite to each other. The first coupling element includes a plurality of flexible tabs slantedly protruding from the exterior surface at the first end portion. The first coupling element further includes threads configured along the interior surface at the first end portion, while the second end portion along the interior surface remains non-threaded. The first coupling element from the interior surface via the threads is coaxial engaged to at least one annular fitting of the annular fittings. Further, the second coupling element also defines inner and outer surfaces opposite to each other, and primary and secondary end portions opposite to each other. The second coupling element includes a plurality of rigid tabs extending inwards from the inner surface. The second coupling element coaxially surrounds to engage the first coupling element such that the plurality of flexible tabs and the plurality of rigid tabs interact with each other to tighten and loosen the coupling assembly against the annular fittings via application of torque.

During tightening of the coupling assembly against the annular fittings, the torque below or equal to a threshold value is applied. At the threshold value of the torque, the plurality of rigid tabs flexes the plurality of flexible tabs in a direction of tightening to attained an engaged position for coupling the coupling assembly with the annular fittings and protecting over-tightening thereof.

During loosening of the coupling assembly against the annular fittings, the torque above or equal to the threshold value is applied. At the threshold value of the torque, the plurality of rigid tabs, while maintaining the engaged position with the plurality of flexible tabs, flexes the plurality of flexible tabs in a direction of loosening for decoupling the coupling assembly with the annular fitting. The application of torque is manual.

In a preferred embodiment of the present disclosure, the threshold value of the torque is directly proportional to thickness of the plurality of flexible tabs. Further, in another preferred embodiment, the exterior surface of the first coupling element and the inner surface of the second coupling element are non-threaded, thereby enabling the first and second coupling elements' assembly to be fracture safe.

In one embodiment, the coupling assembly may include an engaging arrangement to surroundingly engage the first and second coupling elements with each other. The engaging arrangement includes at least one engaging shelf and at least one engaging tabs. The engaging shelf is configured across the exterior surface at the second end portion of the first coupling element. Further, the engaging tabs are configured across the inner surface at the primary end portion of the second coupling element. The engaging shelf and tabs engage with each other to in turn surroundingly engage the first and second coupling elements.

In one embodiment, the first coupling element of the coupling assembly may include an O-ring groove at the second end portion to coaxially fit the annular fittings. Further, the second coupling element of the coupling assembly includes a plurality of projections projecting from the exterior surface to enable tightening and loosening of the coupling assembly against the annular fittings.

In another embodiment, the coupling assembly includes a plurality of dead stop elements, each behind a respective flexible tab to prevent over flexing of the flexible tabs in the direction of loosening, while de-coupling the coupling assembly with the annular fitting.

In a further aspect, an assemblage method of the coupling assembly to the annular fittings is disclosed. In yet a further aspect, the manufacturing method of the coupling assembly is disclosed.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed description and claims taken in conjunction with the accompanying drawing, wherein like elements are identified with like symbols, and in which:

FIGS. 6A and 6B illustrate flexible and rigid tabs engagement and torque developed therein, in accordance with an exemplary embodiment of the present disclosure, wherein FIG. 6B is an enlarged view of the area within the rectangle 6B in FIG. 6A;

FIGS. 8A and 8B illustrate flexible and rigid tabs engagement and stress developed therein due to the torque, in accordance with an exemplary embodiment of the present disclosure, wherein FIG. 8B is an enlarged view of the area within the rectangle 8B in FIG. 8A;

FIGS. 10A-10F illustrate gradual stress development while loosening the coupling assembly, in accordance with an exemplary embodiment of the present disclosure, wherein FIG. 10F is an enlarged view of the area within the rectangle 10F in FIG. 10E;

Like reference numerals refer to like parts throughout the description of several views of the drawings.

DETAILED DESCRIPTION OF EXEMPLARY EMBODIMENTS

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices may be shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "primary," "secondary," "first," "second," "inner," "outer," "interior," "exterior" and the like, herein do not denote any order, elevation or importance, but rather are used to distinguish one element from another. Further, the terms "a," "an," and "plurality" herein do not denote a limitation of quantity, but rather denote the presence of at least one of the referenced item.

Figure 1A:
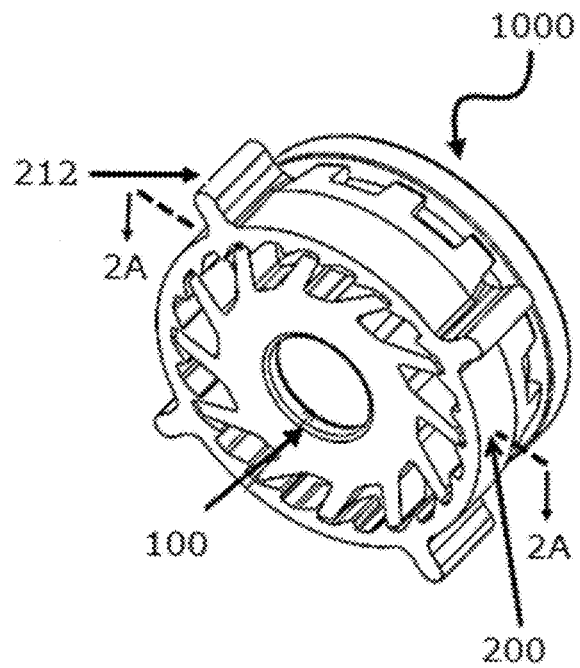
FIG. 1A illustrates a coupling assembly in accordance with an exemplary embodiment of the present disclosure.
Figure 1B:
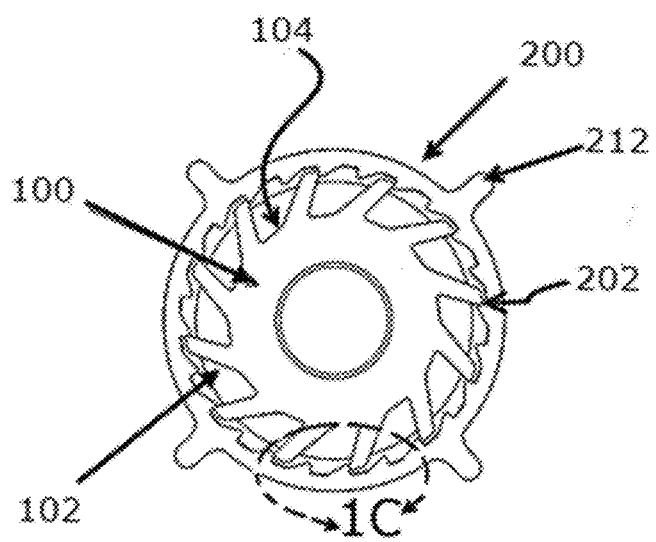
FIG. 1B illustrates a bottom side view of the coupling assembly of FIG. 1A.
Figure 1C:
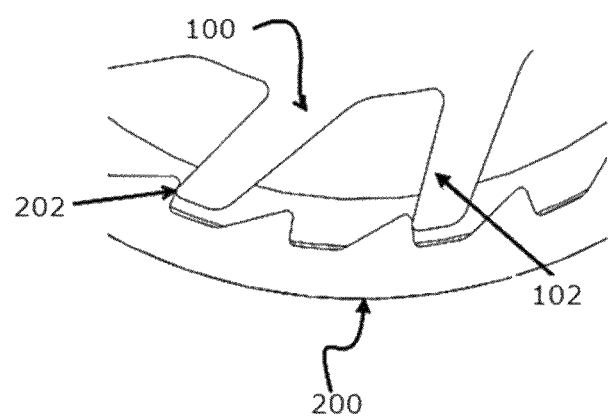
FIG. 1C is an enlarged view of the area within the oval 1C in FIG. 1B, which illustrates engagement of first and second coupling elements of the coupling assembly of FIG. 1A.
Figure 2A:
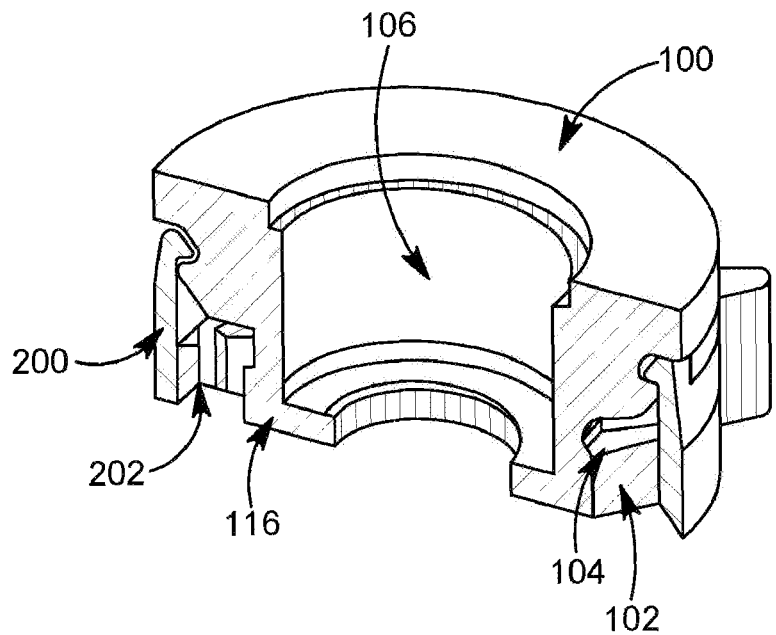
FIG. 2A illustrates a perspective cross-sectional view of the coupling assembly of FIG. 1A along the section line 2A-2A in FIG. 1A, in accordance with an exemplary embodiment of the present disclosure.
Figure 2B:
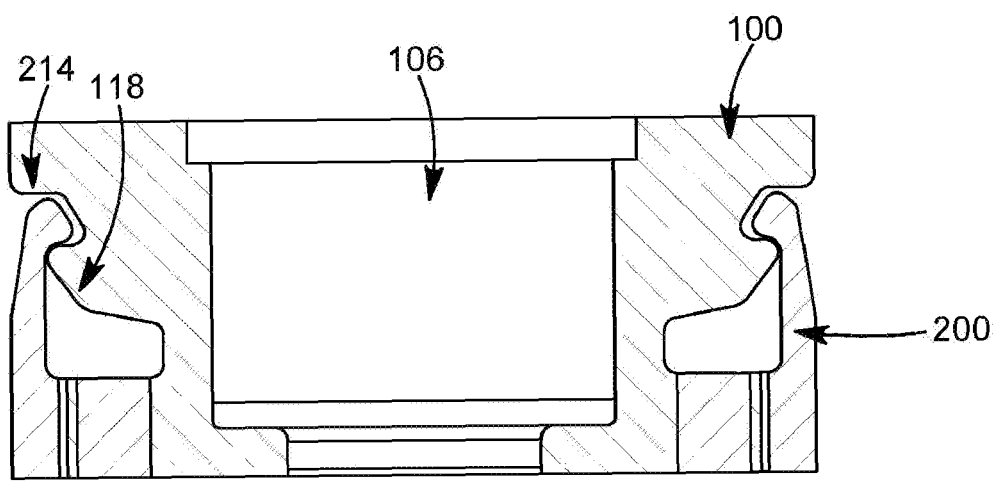
FIG. 2B illustrates an elevational cross-sectional view taken along the same section line.
Figure 3A:
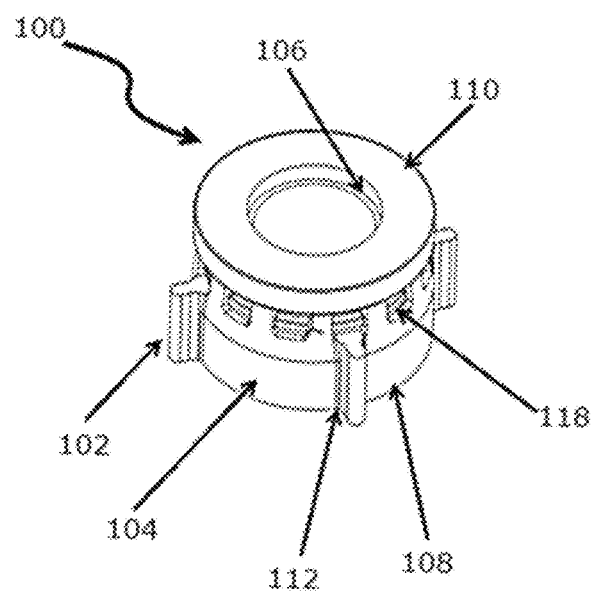
FIGS. 3A, 3B and 3E illustrate various views of a first coupling element of the coupling assembly of FIG. 1A, in accordance with an exemplary embodiment of the present disclosure.
Figure 3B:
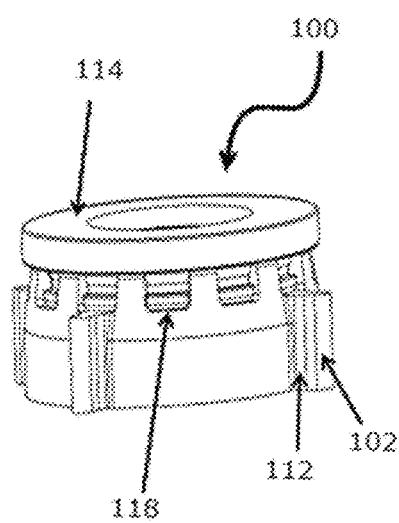
Figure 3E:
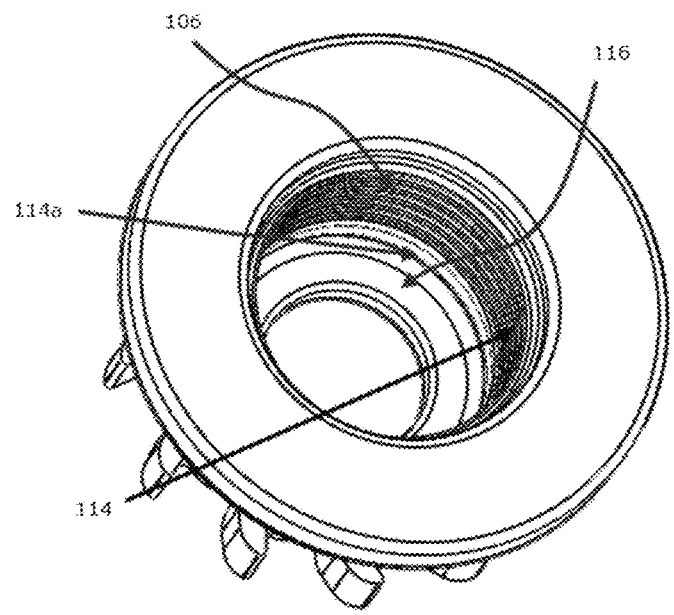
Figure 4A:
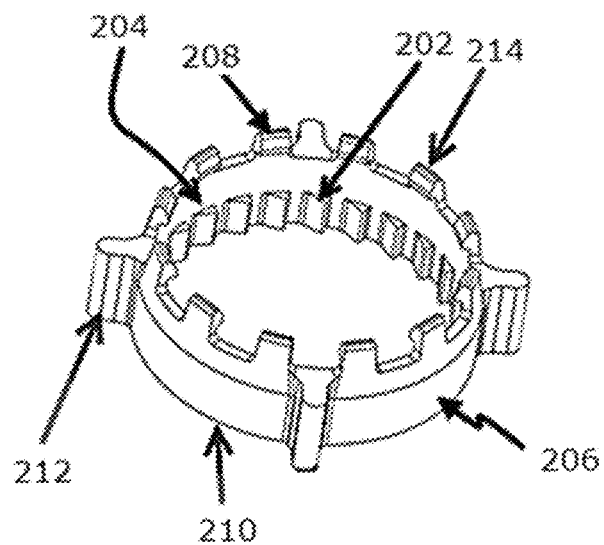
FIGS. 4A and 4B illustrate various views of a second coupling element of the coupling assembly of FIG. 1A, in accordance with an exemplary embodiment of the present disclosure.
Figure 4B:
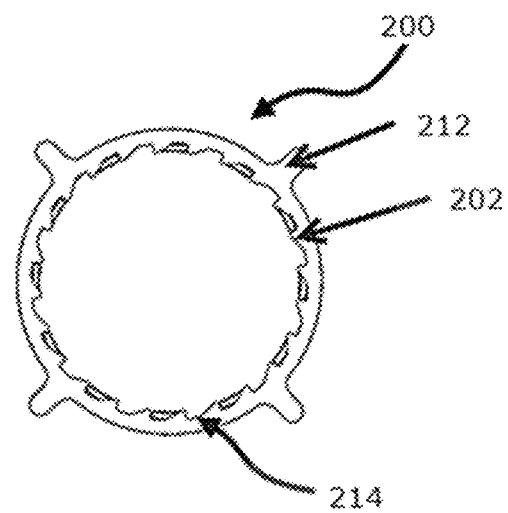

Referring to FIGS. 1A to 2B, an example of a coupling assembly 1000 is illustrated in accordance with an exemplary embodiment of the present disclosure. The coupling assembly 1000 includes a first coupling element 100 and a second coupling element 200. The first and second coupling elements 100, 200 are coaxially and operatively engaged to enable coupling of the coupling assembly 1000 with annular fittings, such as a first annular fitting 300 and a second annular fitting 400 and will be described herein with respect to FIG. 5. Such a configuration of the first and second coupling elements 100, 200 facilitates coupling between the first annular fitting 300 and the second annular fitting 400. Herein, the first coupling element 100 will also be described in conjunction to FIGS. 3A, 3B and 3E, and the second coupling element 200 will also be described in conjunction to FIGS. 4A and 4B. The coupling assembly 1000 may be made of a suitable plastic material. However, the coupling assembly 1000 of the present disclosure is not limited to any particular material used for manufacturing thereof, and the coupling assembly 1000 may be made of any suitable material that has a capability to withstand the coupling stresses and which is durable and economical. Further, the coupling assembly 1000 may be manufactured by forming the first and second coupling elements 100, 200 by processes, such as molding, forming, etc., without departing the scope of other manufacturing process as found suitable. Further, the coupling assembly 1000 may be made of any suitable dimension to meet the demands of the market and users.

The first coupling element 100 (individually shown in FIGS. 3A, 3B and 3E) includes a plurality of flexible tabs, such as flexible tabs 102. The first coupling element 100 is shaped to form a ring-like structure that defines exterior and interior surfaces, specifically exterior and interior radial surfaces, 104 and 106 that are opposite to each other. The interior surface 106 is adapted to coaxially fit over the first annular fitting 300, wherein the first annular fitting 300 may be an inlet pipe. Such structure of the first coupling element 100 also defines first and second end portions 108 and 110 thereof, wherein the first and second end portions 108 and 110 are opposite to each other. The flexible tabs 102 slantedly protrude from the exterior surface 104 along the second end portion 110 in equidistance relation from each other. The flexible tabs 102 can flex in either direction depending upon the direction of the flexing torques acting thereon. In one embodiment, each flexible tab 102 may include at least one dead stop element 112 that may prevent over flexing the flexible tabs 102 or hyperextension of the flexible tabs 102, more particularly, the dead stop element 112 comes into action as the flexible tabs 102 become radially straight under the action of flexing torques acting on the flexible tabs 102 during the coupling nut removal operation, i.e., while decoupling the coupling assembly 1000 from the annular fittings 300 and 400.

Figure 3C:
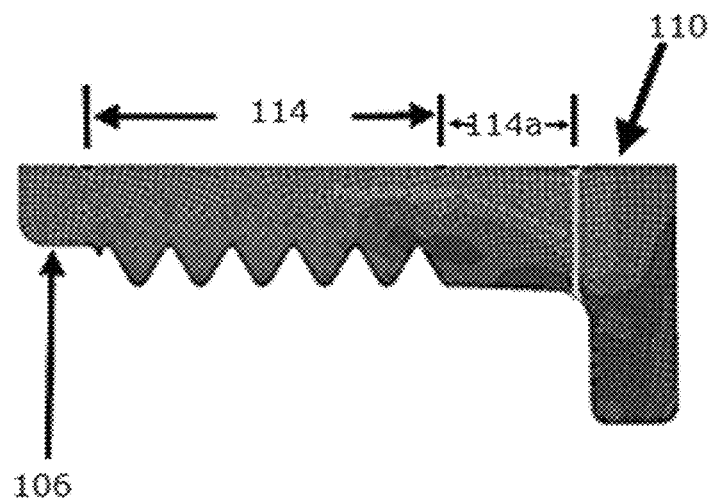
FIGS. 3C and 3D illustrate a thread configuration of the first coupling element, and assemblage thereof with the annular fittings, respectively, in accordance with an exemplary embodiment of the present disclosure.
Figure 3D:
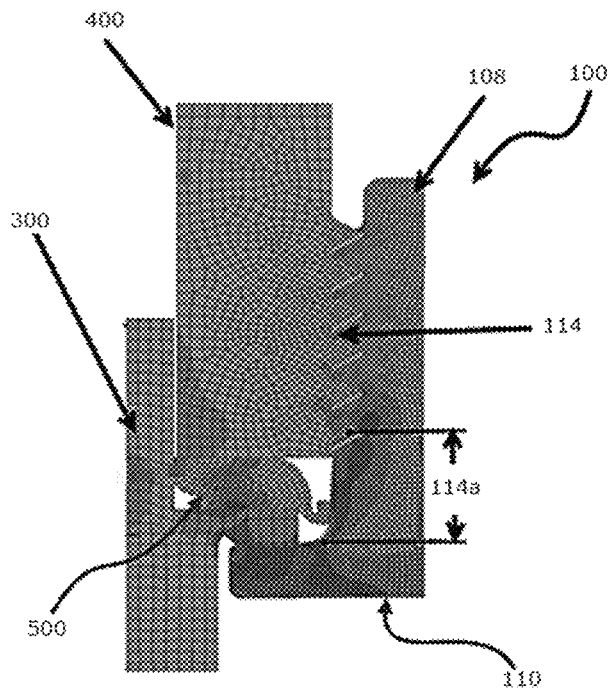
Figure 5:
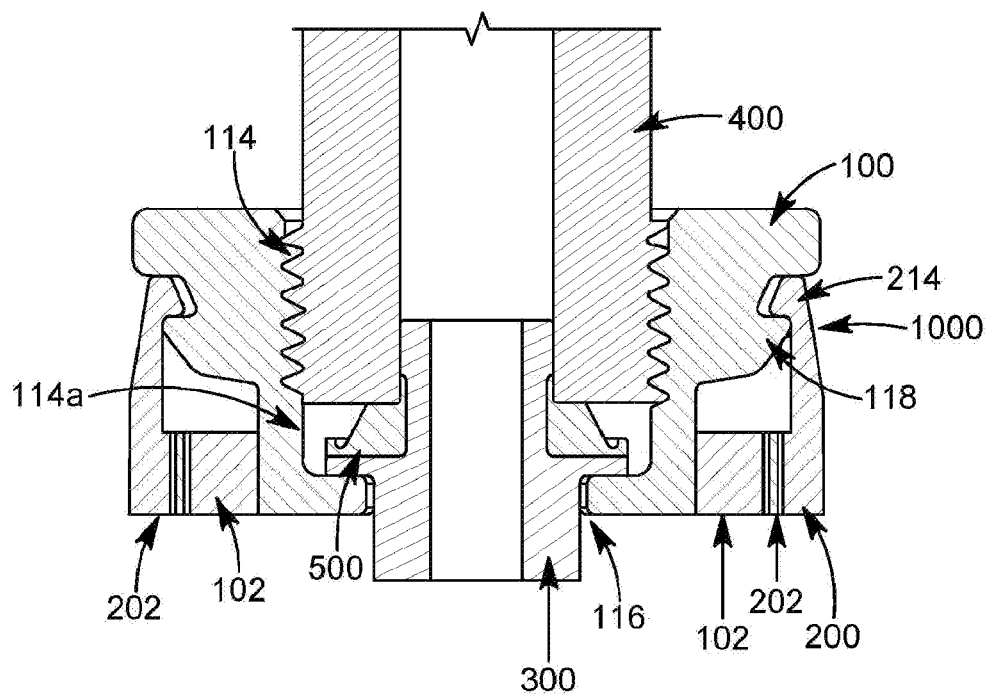
FIG. 5 illustrates a cross-sectional view of the assemblage of the coupling assembly of FIG. 1A with annular fittings, in accordance with an exemplary embodiment of the present disclosure.
Figure 14:
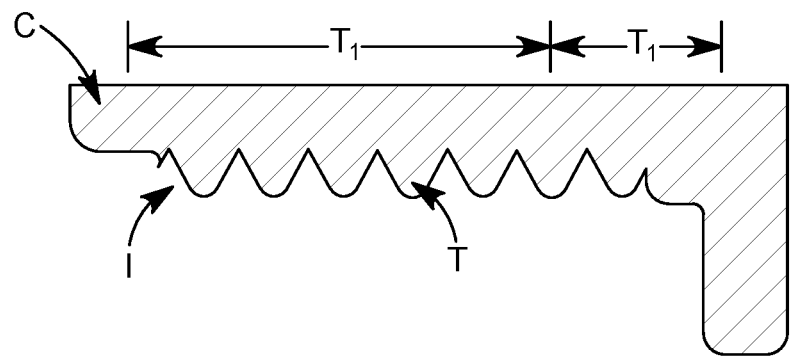
FIG. 14 illustrates a typical threads configuration of presently known coaxial connector component of the known coupling nut assembly to depict comparative difference of the thread configuration of the present coupling assembly, as evident in FIG. 3C.
Figure 15:
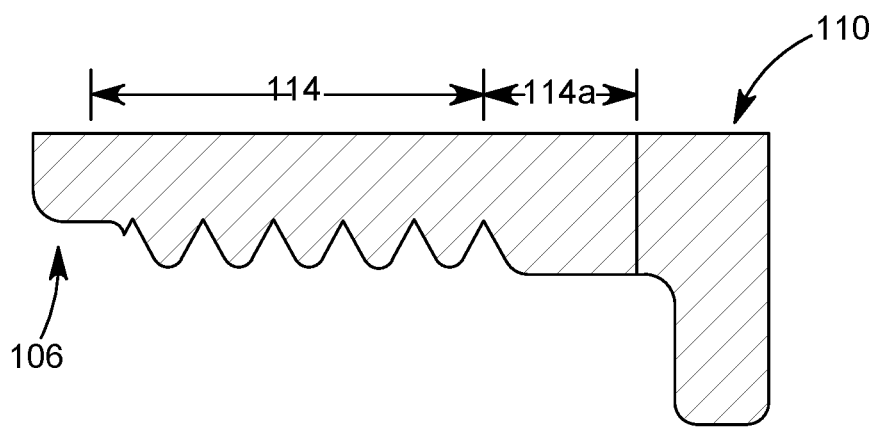
FIG. 15 is a reproduction of the thread configuration of the present coupling assembly shown in FIG. 3C to depict the comparative difference between the thread configuration of the present coupling assembly and the thread configuration of the known coupling nut assembly of FIG. 14.

In a preferred embodiment, the first coupling element 100 includes threads 114. The threads 114 are configured along the interior surface 106 at the first end portion 108, whereas the second end portion 110 along the interior surface 106 remains non-threaded. Such threads 114 and a non-threaded region 114a may be more clearly evident in FIG. 3C. Further, to more clearly distinguish this novel aspect among others, i.e. the threads 114 configuration of the present disclosure, a comparative prior art is illustrated in FIG. 14, where the thread configuration 'T' extends towards a bottom portion 'B' (mentioned as 'Bottom Thread Region' '$T_1$') along the inner circumference side 'I' of the coaxial connector component 'C.' The elimination of the Bottom Thread Region' '$T_1$' in the present design as shown in FIG. 15, which is a reproduction of FIG. 3C, is advantageous ins elimination of stress along the second end portion 110. The first coupling element 100 from the interior surface 106 via the threads 114 enables coaxial engagement of the first annular fitting 300, and is evident in FIG. 3D. The first coupling element 100 further includes an O-ring groove 116 configured along the second end portion 110 for facilitating engagement of the first coupling element 100 with the annular fittings. Further, the threads 114 formed on the interior surface 106 also facilitate coaxial fitting/coupling of the first coupling element 100 over the annular fitting 300 as illustrated in FIG. 5.

The second coupling element 200 (individually shown in FIGS. 4A and 4B) includes a plurality of rigid tabs, such as rigid tabs 202. The second coupling element 200 is similar to the first coupling element 100 in terms of having a ring-like structure that defines inner and outer surfaces 204, 206 that are opposite to each other. Such a configuration of the second coupling element 200 also defines primary and secondary end portions 208, 210 respectively that are opposite to each other. The rigid tabs 202 extend inward from the inner surface 204 along the secondary end portion 210 in equidistance relation from each other. Further, the rigid tabs 202 have profiles that facilitate engagement of the flexible tabs 102 with the rigid tabs 202. In one embodiment, the second coupling element 200 may include a plurality of projections, such as projections 212, projecting from the outer surface 206 to facilitate angular movement of the second coupling element 200, thereby enabling tightening and loosening of the coupling assembly 1000 against the annular fittings.

The second coupling element 200 coaxially surrounds and engages with the first coupling element 100 such that the flexible tabs 102 and the rigid tabs 202 interact with each other. In one embodiment, to enable proper surroundable engagement of the second coupling element 200 with the first coupling element 100, an engaging arrangement may be provided on the first and second coupling elements 100, 200. The engagement arrangement may include at least one engaging shelf, such as engaging shelf 118, configured across the exterior surface 104 at the first end portion 108 of the first coupling element 100 and at least one engaging tab, such as engagement tabs 214, which may be configured across the inner surface 204 at the primary end portion 208 of the second coupling element 200. The engaging shelf 118 and engagement tabs 214 engage with each other to facilitate surroundable engagement of the second coupling element 200 with the first coupling element 100. However, without departing from the scope of the present disclosure, surroundable engagement between the first and second coupling elements 100, 200 may be in any other manner as may be suitable and required according to the industry standards and need.

During the coupling nut installation, initially the second coupling element 200 coaxially rotates in anticlockwise direction under the action of applied torque to facilitate engagement between the rigid tabs 202 and the flexible tabs 102. The rotation of the second coupling element 200 may also result in engagement between the coupling assembly 1000 and the second annular fitting 400, thereby tightening the coupling assembly 1000 against the annular fittings 300 and 400. As the tightening operation proceeds further, the rigid tabs 202 and the flexible tabs 102 may further engage with each other, and the rigid tabs 202 apply flexing torques on the flexing tabs 102 to cause flexing thereof. As the flexing tabs 102 flex to their limit, the flexing tabs 102 may not flex further and restrain further rotation of the second coupling element 200 irrespective of the torque applied, which in turn may restrain further tightening of the coupling assembly 1000 against the annular fittings 300 and 400 and prevent damages caused by over-tightening. In this manner the over-tightening may be prevented by restraining rotation of the second coupling element 200 irrespective of the torque application. The threshold value of the torque applied corresponding to which there is no further tightening with increase in torque is referred to as the "ratcheting torque value". The "ratcheting torque value" may be adjusted either by altering the thickness of the flexible ribs 102 or by altering the stiffness of the flexible ribs 102.

Further, while detailed explanation of the first and second coupling elements 100, 200 may have been made herein, an important point to be made and established herein is that the exterior surface 104 of the first coupling element 100 and the inner surface 204 of the second coupling element 200 are non-threaded. To rotate the second coupling element 200 against the first coupling element 100 for coupling of the coupling assembly 1000 to the annular fittings, interaction of the rigid and flexible tabs 202 and 102 respectively are jointly responsible as against the conventional coupling nuts where threads were also responsible resulting causing fracture therein. Such thread-less design of the first and second coupling elements 100, 200 of the coupling assembly 1000 may be fracture safe as against conventional threaded coupling nuts.

Referring now to FIG. 5, wherein a cross-sectional view of an example illustration of an assemblage method of coupling the coupling assembly 1000 with the first annular fitting 300 and the second annular fitting 400 is depicted in accordance with an exemplary embodiment of the present disclosure. In doing so, the coupling nut 1000 also includes a compression seal 500, which is disposed between the first and second annular fittings 300 and 400 when the coupling assembly 1000 is adapted to coaxially engage the first and second annular fittings 300 and 400. Specifically, the coupling assembly 1000 is adapted to coaxially engage the first annular fitting 300 with the first coupling element 100, wherein the threads 114 formed on the interior surface 106 of the first coupling element 100 facilitate coaxial fitting of the first annular fitting 300 with the first coupling element 100. Further, the second coupling element 200 coaxially surrounding the first coupling element 100 may be rotated to tighten the coupling assembly 1000 against the annular fittings 300 and 400 via application of a torque below or equal to the threshold value. At the threshold value of the torque, the rigid tabs 202 flexes the flexible tabs 102 to their limits in a direction of tightening to attain an engaged position for coupling the coupling assembly 1000 with the annular fitting 300. Such engaged position may ensure blocking of further rotation of the second coupling element 200 against the first coupling element 100, thereby discouraging a user who is using the coupling assembly 1000 from further applying torque for further tightening, thereby preventing over-tightening and damage caused by over-tightening. Further at such engaged position, an audible sound may also be heard and a tactile indication felt that alerts the user regarding reaching of the tightening limit and that no further tightening is required, thereby ensuring that the user stops applying further torque after obtaining engaged position. Further, the absence of the threads, as mentioned above, also prevents over-tightening of the coupling assembly 1000, thereby enabling the first and second coupling elements 100 and 200 and assembly thereof to be fracture safe. Furthermore, with the presence of the compression seal 500, which is not excessively compressed due to bottom thread removal, non-threaded region 114a, and due to the ratcheting mechanism obtained by the rigid tabs 202 flexing the flexible tabs 102 combination, reduces overall stress along the second end portion 110 (may also be called a fracture plane) of the coupling assembly 1000.

In one further embodiment, stress in any standard conventional coupling assembly may be reduced just by eliminating the threads and forming a non-threaded region, such as the non-threaded region 114a, without the requirement of ratcheting mechanism to be the part of such conventional coupling assembly.

The coupling assembly 1000 may also be loosened in order to de-couple the coupling assembly 1000 from the annular fittings 300 and 400. Loosening may be performed via application of the torque above or equal to the threshold value but in the direction opposite to the direction in which the tightening torque is applied. The torque above the threshold value enables the rigid tabs 202, while maintaining the engaged position with the flexible tabs 102, to flex the flexible tabs 102 in a direction of loosening for decoupling the coupling assembly 1000 with the annular fittings 300 and 400. In order to prevent over flexing of the flexible tabs 102 in the direction of loosening, while decoupling the coupling assembly 1000 with the annular fittings, the dead stop element 112 is provided behind each of the flexible tabs 102.

In both the cases, while tightening and loosening, the threshold value of the torque is directly proportional to the thickness of the flexible tabs 102 or the stiffness of the rigid tabs 202.

Figure 6A:
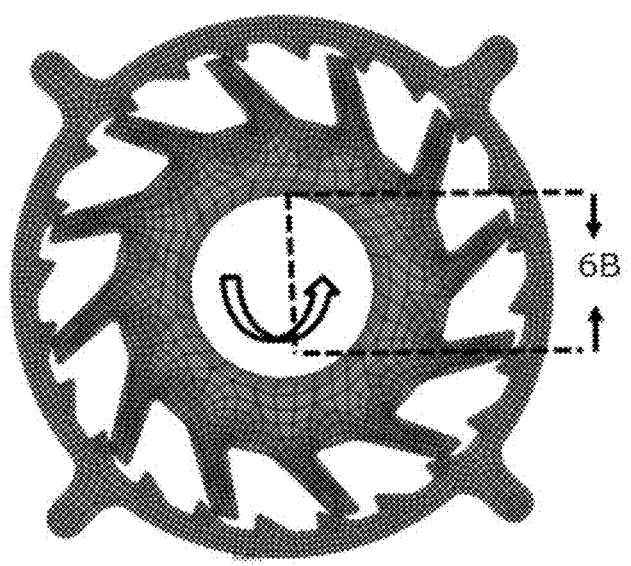
Figure 6B:
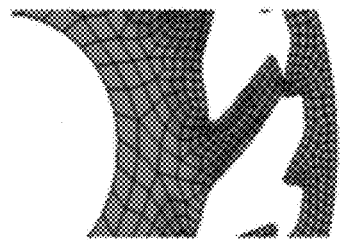
Figure 7A:
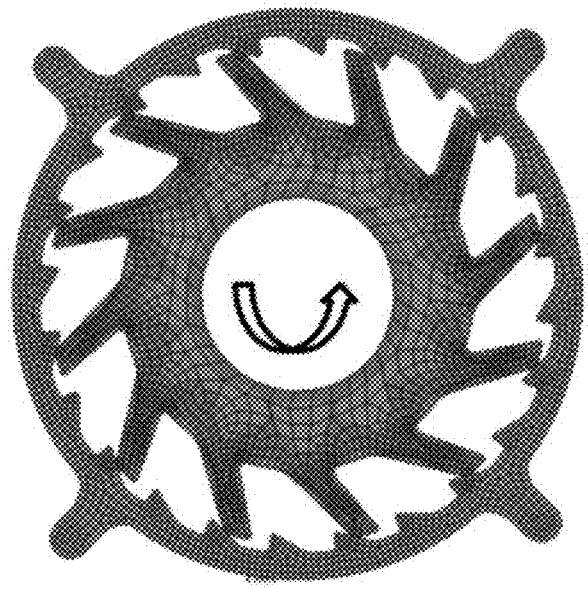
FIGS. 7A-7D illustrate gradual torque development while tightening the coupling assembly, in accordance with an exemplary embodiment of the present disclosure.
Figure 7B:
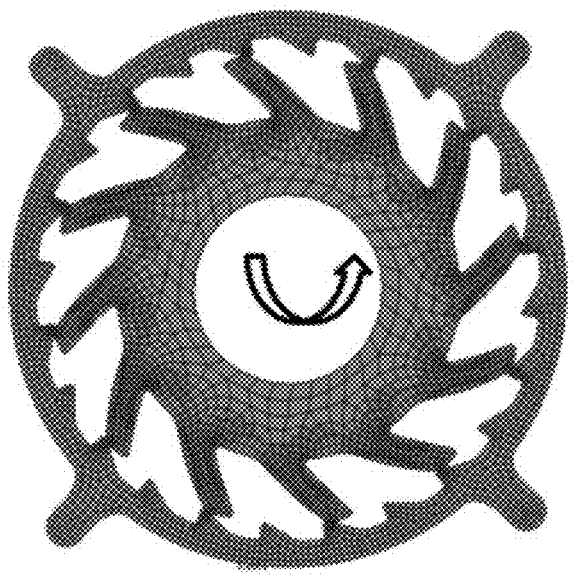
Figure 7C:
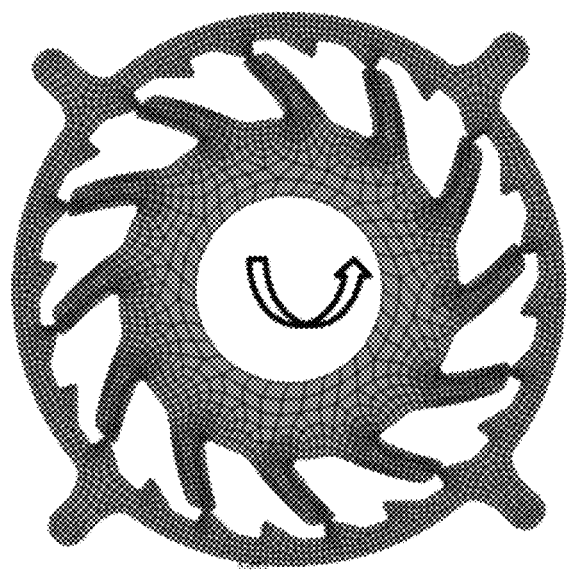
Figure 7D:
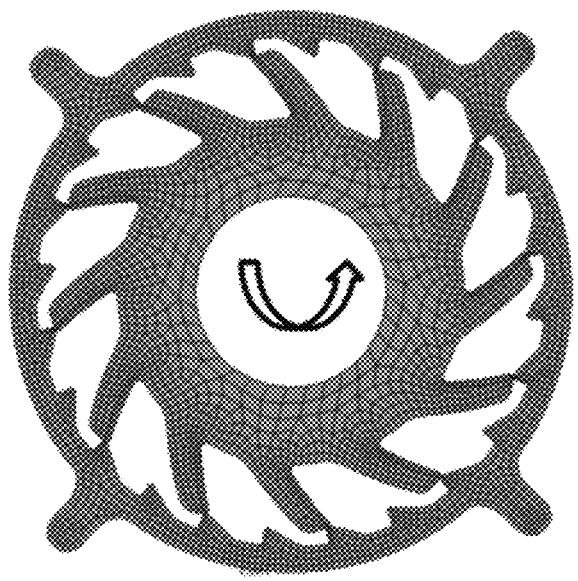
Figure 8A:
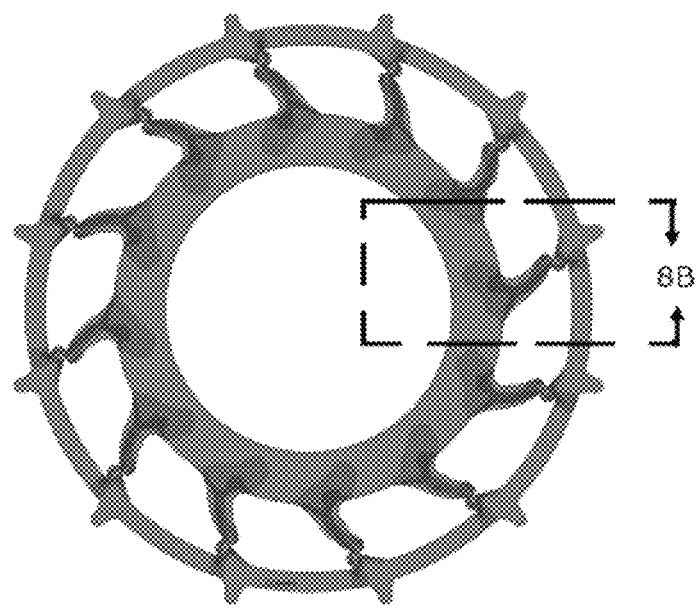
Figure 8B:
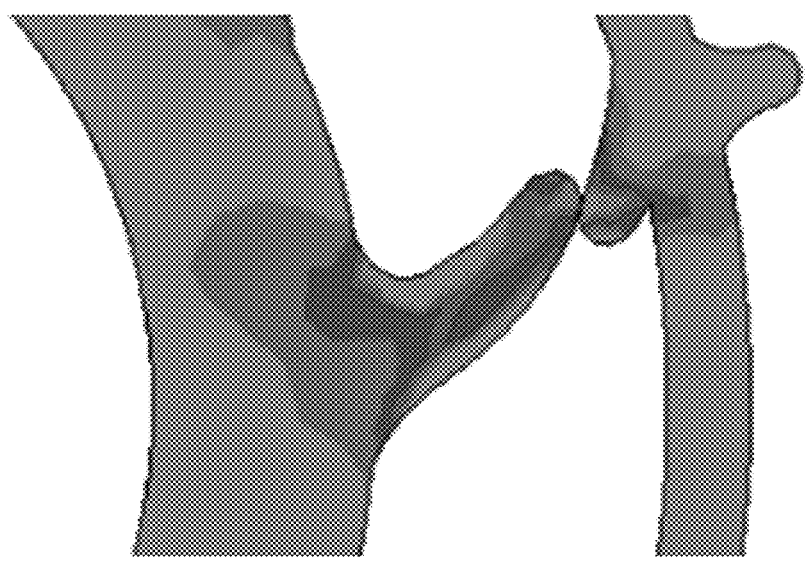
Figure 9A:
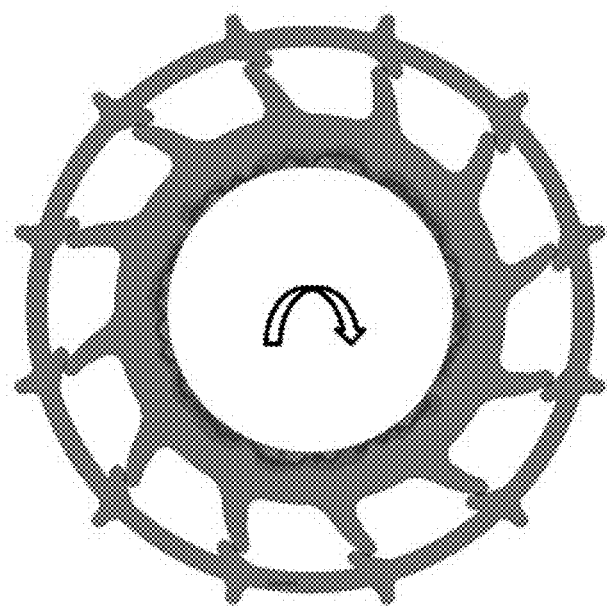
FIGS. 9A-9D illustrate gradual stress development while tightening the coupling assembly, in accordance with an exemplary embodiment of the present disclosure.
Figure 9B:
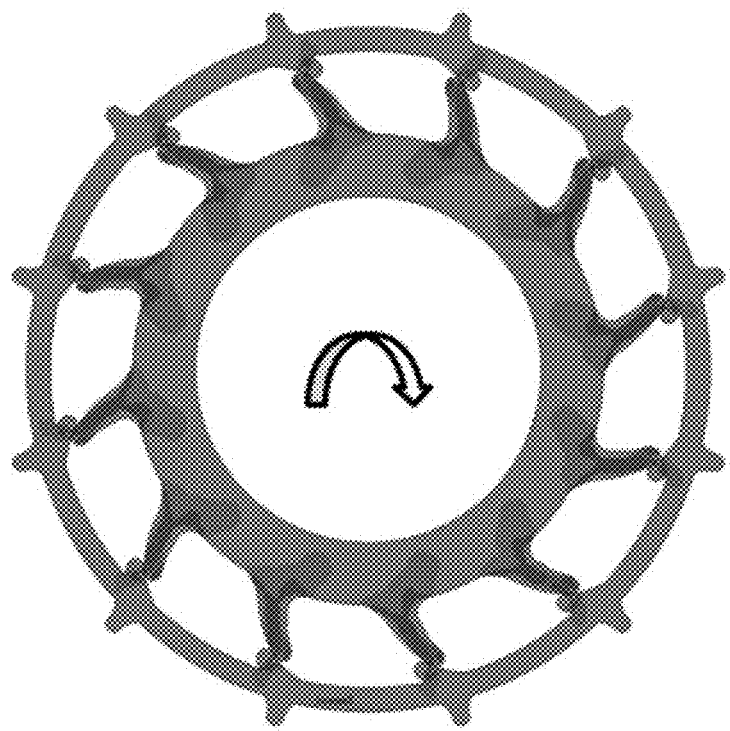
Figure 9C:
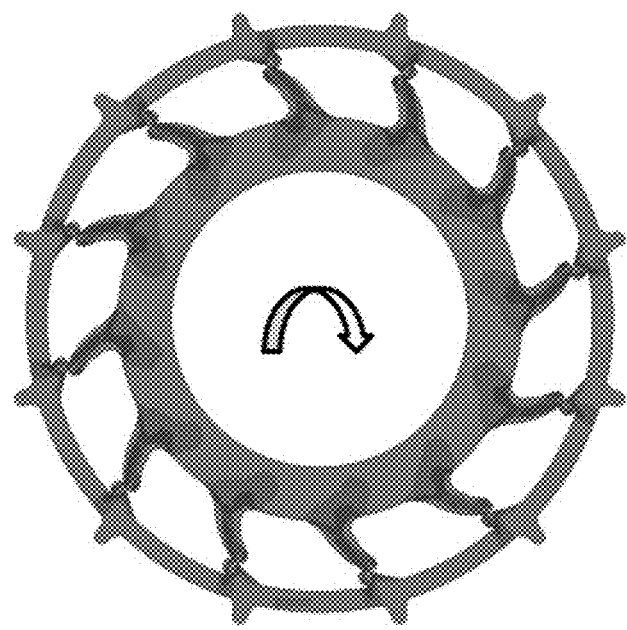
Figure 9D:
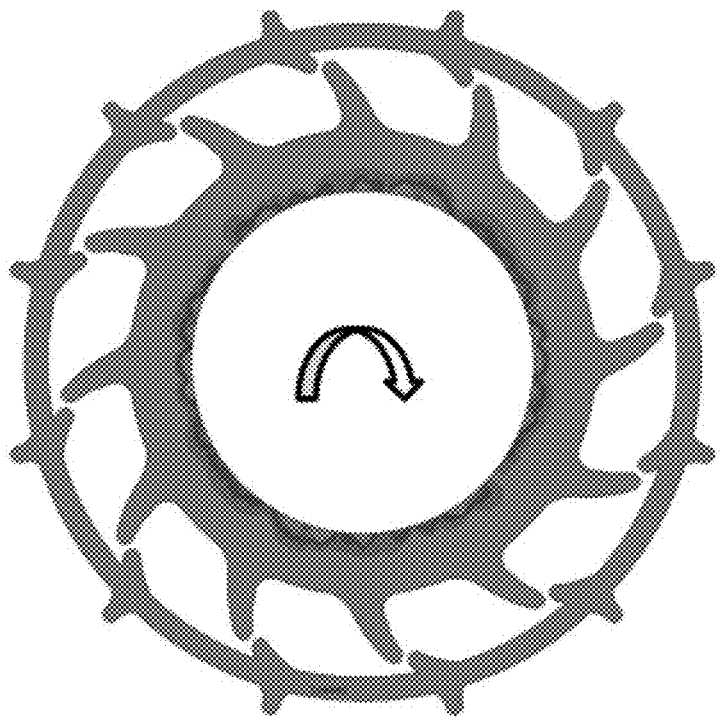
Figure 10A:
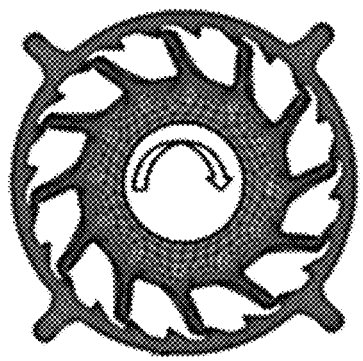
Figure 10B:
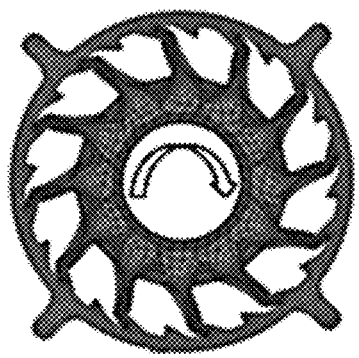
Figure 10C:
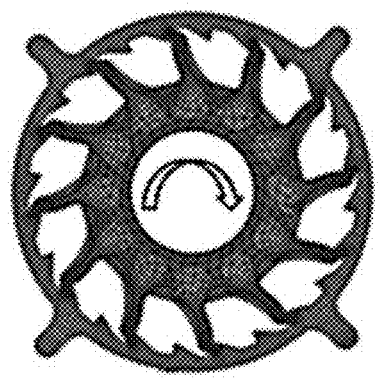
Figure 10D:
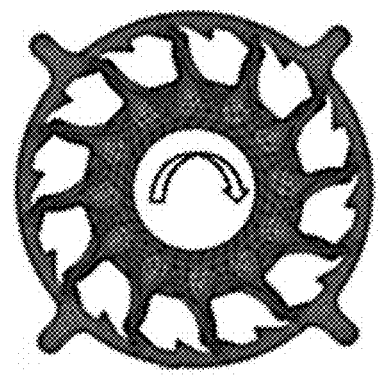
Figure 10E:
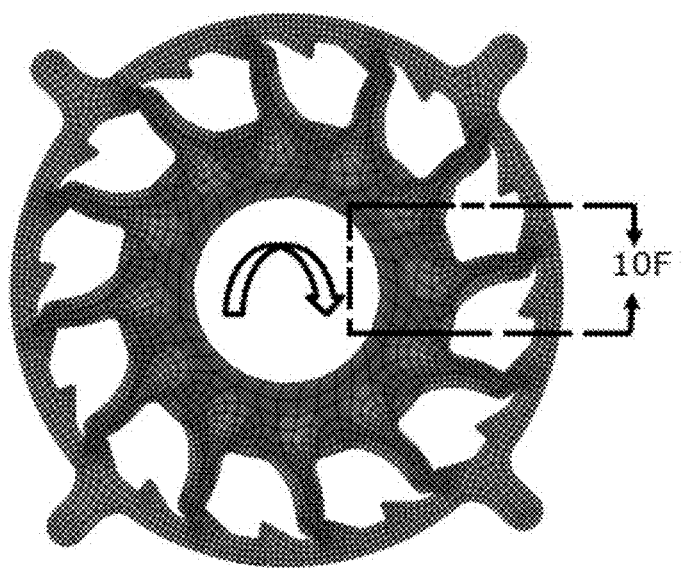
Figure 10F:
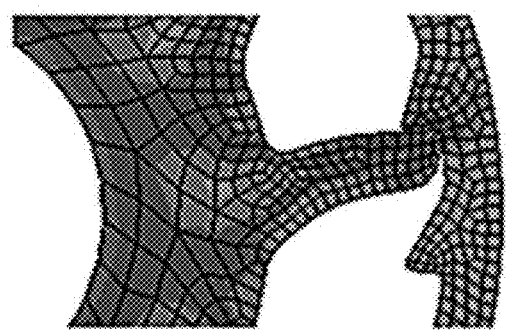
Figure 11A:
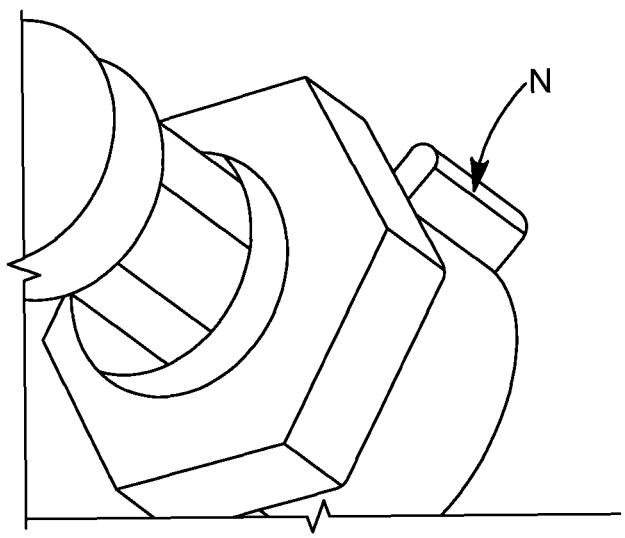
FIGS. 11A-11E illustrate a typical coupling nut and assemblage thereof, as known in the art.
Figure 11B:
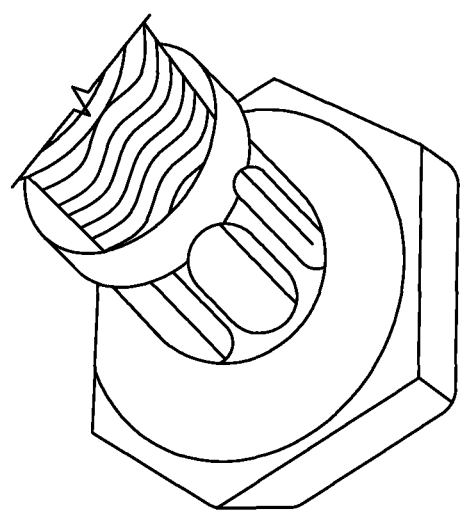
Figure 11C:
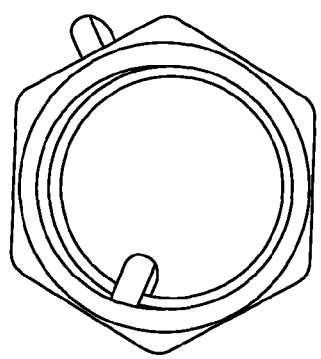
Figure 11D:
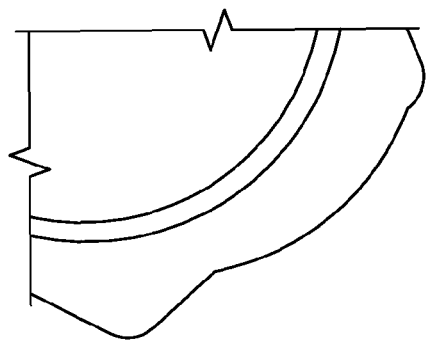
Figure 11E:
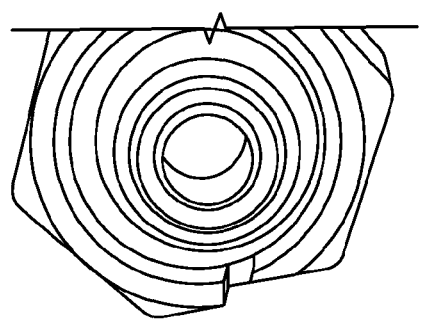
Figure 12:
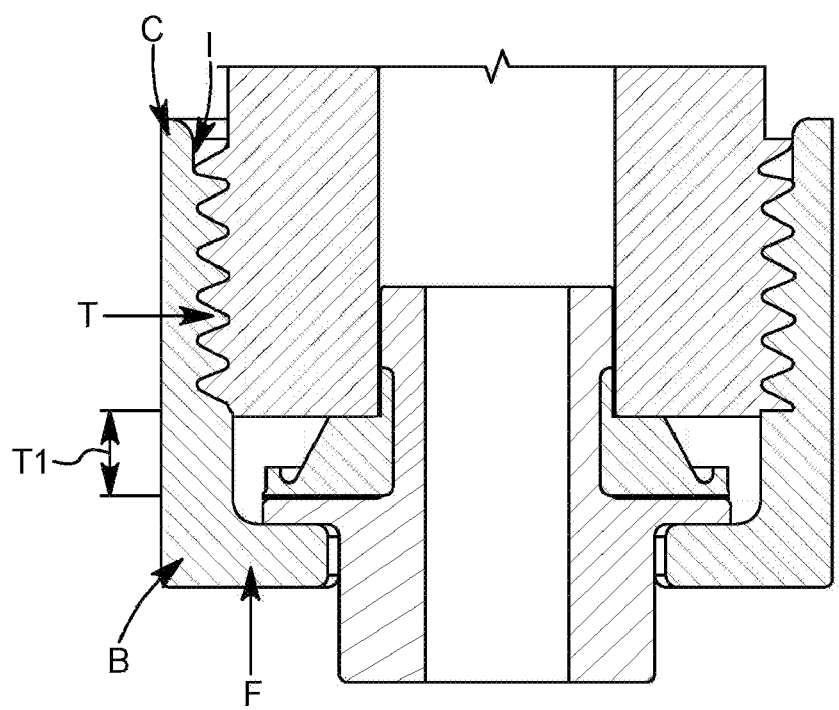
FIG. 12 illustrates a typical coaxial connector component of the coupling nut assembly as known in the art.
Figure 13A:
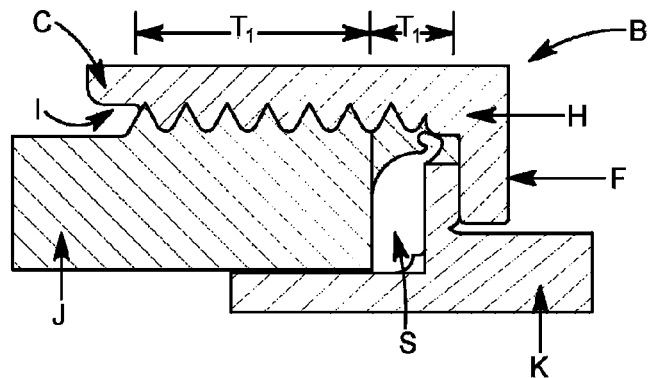
FIGS. 13A-13C depict tensile stress development in the bottom flanged region of the typical coaxial connector component of the coupling nut assembly as known in the art.
Figure 13B:
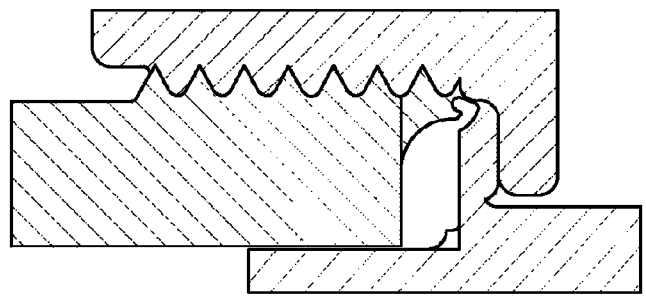
Figure 13C:
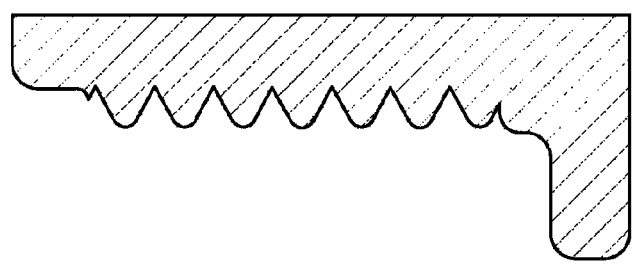

Various figures have been illustrated herein analyzing torque and stress development while tightening and loosening the coupling assembly 1000. For example, FIGS. 6A and 6B) illustrate flexible and rigid tabs 102, 202 engagement and torque developed therein, in accordance with an exemplary embodiment of the present disclosure. Further, FIGS. 7A-7D illustrate gradual torque development while tightening the coupling assembly 1000, in accordance with an exemplary embodiment of the present disclosure. Furthermore, FIGS. 8A and 8B illustrate flexible and rigid tabs 102, 202 engagement and stress developed therein due to the torque, in accordance with an exemplary embodiment of the present disclosure. Moreover, FIGS. 9A-9D illustrate gradual stress development while tightening the coupling assembly 1000, in accordance with an exemplary embodiment of the present disclosure. FIGS. 10A-10F illustrate gradual stress development while loosening the coupling assembly 1000, in accordance with an exemplary embodiment of the present disclosure.

A coupling assembly of the present disclosure is advantageous in various scopes. The coupling assembly may be capable of effectively establishing connection between two potential ports, generally relating to sink and water tank ports via a pipe, enabling manual operation. The coupling assembly may be capable of precluding or avoiding over-tightening of the coupling assembly in-turn precluding or avoiding resultant fracture to avoid unexpected or potential leakage or flooding due to thread-less design thereof. Further, the coupling assembly may be capable of being economically fabricated and assembled with relative ease.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

CALL LIST

1000 Coupling assembly
100 First coupling element
102 Plurality of flexible tabs
104 Exterior surface of the first coupling element 100
106 Interior surface of the first coupling element 100
108 First end portion of the first coupling element 100
110 Second end portion of the first coupling element 100
112 Dead stop element disposed behind each flexible tab 102
114 Threads formed on the interior surface 106
114a Non-threaded region
116 O-ring groove
118 Engaging shelf
200 Second coupling element
202 Plurality of rigid tabs
204 Inner surface of the second coupling element 200
206 Outer surface of the second coupling element 200
208 Primary end portion of the second coupling element 200
210 Secondary end portion of the second coupling element 200
212 Plurality of projections configured on the outer surface 206
214 At least one engagement tab configured on the inner surface 206
300 First annular fitting
400 Second annular fitting
500 Compression seal
N Typical coupling nut
C Typical coaxial connector component
I Inner circumference side
T Threads
$T_1$ Bottom Thread Region
B Bottom portion
F Bottom flanged region
S Compression Seal
H Horizontal stress line

What is claimed is:

1. A coupling assembly for coupling a first annular fitting with a second annular fitting, the coupling assembly comprising:
    a first coupling element having,
        interior and exterior surfaces opposite to each other,
        first and second end portions opposite to each other,
        an o-ring groove formed as an annular protrusion from the interior surface at the second end portion, the annular protrusion forming a flat surface extending generally orthogonal from the interior surface;
        threads formed in the interior surface at the first end portion, wherein the second end portion along the interior surface is non-threaded, forming a non-threaded region to restrict rotation of the first coupling element when threaded on the first annular fitting, the first end portion and the second end portion along the interior surface being continuous, the first coupling element from the interior surface via the threads enables coaxial engagement of the first annular fitting, and
a plurality of flexible tabs slantedly protruding from the exterior surface;
a second coupling element having,
inner and outer surfaces opposite to each other,
primary and secondary end portions opposite to each other, and
a plurality of rigid tabs extending inwards from the inner surface, the second coupling element coaxially surrounds to engage the first coupling element such that the plurality of flexible tabs and the plurality of rigid tabs interact with each other; and
an engaging arrangement to surroundingly engage the first and second coupling elements with each other, wherein the engaging arrangement comprising:
at least one engaging shelf configured across the exterior surface of the first coupling element; and
at least one engaging tab configured across the inner surface of the second coupling element, the engaging shelf and the at least one tab engage with each other to surroundingly engage the first and second coupling elements with each other,
wherein when the coupling assembly is coupled against the annular fittings via a torque below or equal to a threshold value at which the plurality of rigid tabs flexes the plurality of flexible tabs to attain an engagement between the coupling assembly and the annular fittings,
wherein when the coupling assembly is decoupled against the annular fittings, the plurality of rigid tabs maintain the engaged position with the plurality of flexible tabs, and
wherein when an end of the second annular fitting is disposed in a portion of the o-ring groove of the first coupling element and the first coupling element is fully threaded on the first annular fitting, a space is formed between an end of the first annular fitting and the second annular fitting.

2. The coupling assembly as claimed in claim 1, wherein the second coupling element comprises a plurality of projections projecting from the exterior surface to enable tightening and loosening of the coupling assembly against the annular fittings.

3. The coupling assembly as claimed in claim 1, wherein the first coupling element comprises a dead stop element behind each flexible tab of the plurality of tabs.

4. The coupling assembly as claimed in claim 1, wherein the threshold value of the torque is directly proportional to at least one of thickness of the plurality of flexible tabs and stiffness of the plurality of rigid tabs.

5. The coupling assembly as claimed in claim 1, wherein the exterior surface of the first coupling element and the inner surface of the second coupling element are non-threaded.

6. A coupling assembly for coupling a first annular fitting with a second annular fitting, the coupling assembly comprising:
a first coupling element having interior and exterior surfaces opposite to each other, the interior surface adapted to coaxially fit over the first annular fitting, the first coupling element comprising a plurality of flexible tabs slantedly protruding from the exterior surface, the first coupling element having first and second end portions opposite to each other, and the first coupling element having an o-ring groove formed as an annular protrusion from the interior surface at the second end portion, the annular protrusion forming a flat surface extending generally orthogonal from the interior surface, wherein the interior surface at the first end portion has threads formed therein and the interior surface at the second end portion is non-threaded to form a non-threaded region to restrict rotation of the first coupling element on the first annular fitting, the first end portion and the second end portion along the interior surface being continuous;
a second coupling element having inner and outer surfaces opposite to each other, the second coupling element comprising a plurality of rigid tabs extending inwards from the inner surface, the second coupling element coaxially surrounds to engage the first coupling element such that the plurality of flexible tabs and the plurality of rigid tabs interact with each other; and
an engaging arrangement to engage the first and second coupling elements with each other, wherein the engaging arrangement comprising at least one engaging shelf configured across the exterior surface of the first coupling element proximate to the plurality of flexible tabs; and at least one engaging tabs configured across the inner surface of the second coupling element proximate to the plurality of rigid tabs, the engaging shelf and tabs engage with each other to engage the first and second coupling elements with each other,
wherein when the coupling assembly is coupled against the first annular fitting via a torque below or equal to a threshold value at which the plurality of rigid tabs flexes to attain an engagement between the coupling assembly and the annular fittings,
wherein when the coupling assembly is decoupled against the annular fittings, the plurality of rigid tabs maintain the engaged position with the plurality of flexible tabs for decoupling the coupling assembly with the annular fitting,
wherein the exterior surface of the first coupling element and the inner surface of the second coupling element are non-threaded, and
wherein when an end of the second annular fitting is disposed in a portion of the o-ring groove of the first coupling element and the first coupling element is fully threaded on the first annular fitting, a space is formed between an end of the first annular fitting and the second annular fitting.

7. The coupling assembly as claimed in claim 6, wherein the threshold value of the torque is directly proportional to at least one of thickness of the plurality of flexible tabs and stiffness of the plurality of rigid tabs.

8. The coupling assembly as claimed in claim 6, wherein the first coupling element comprises a dead stop element behind each flexible tab of the plurality of tabs.

* * * * *